UNITED STATES PATENT OFFICE.

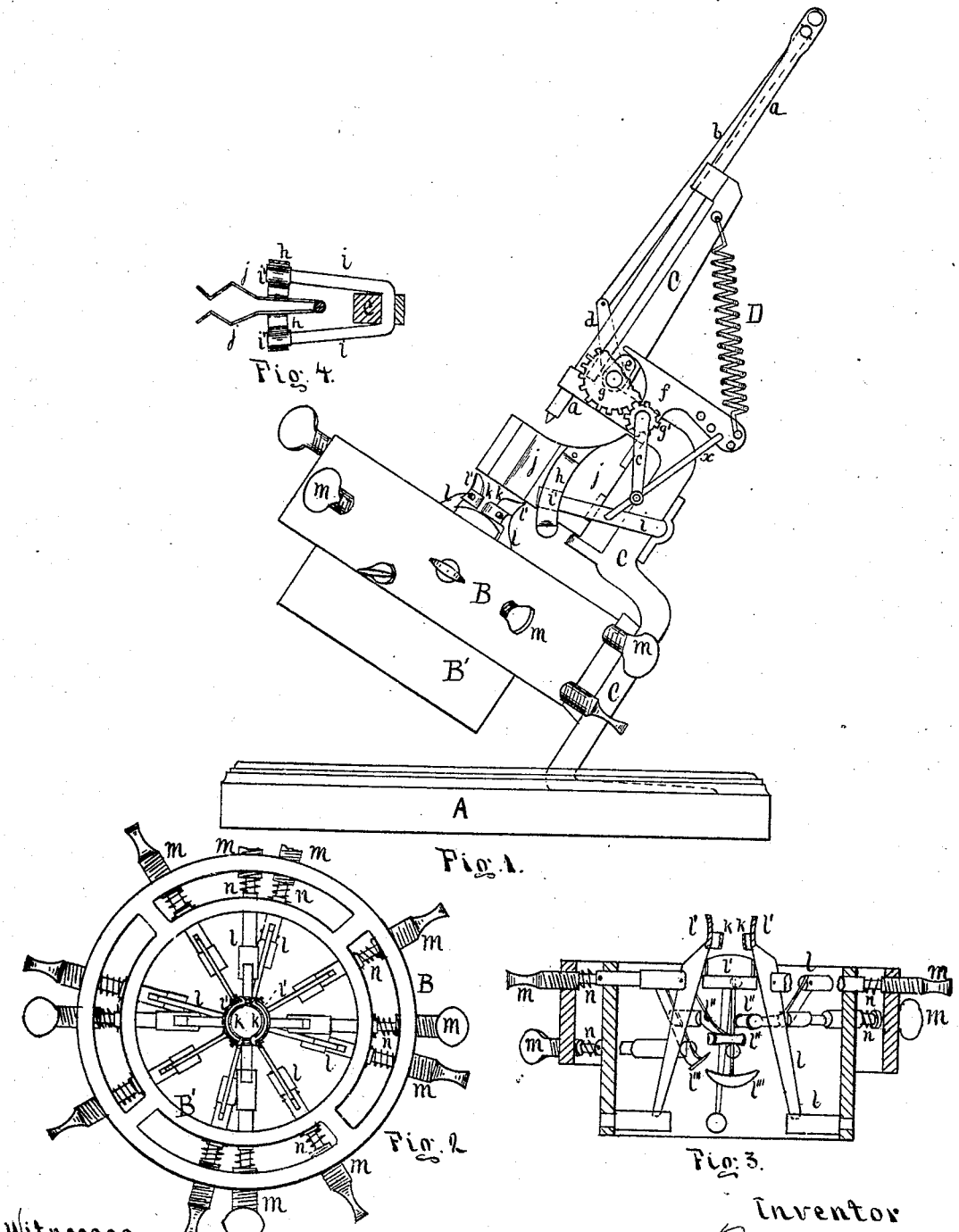

BENJAMIN MERRITT, OF BOSTON, MASSACHUSETTS.

IMPROVEMENT IN GREEN-CORN CUTTERS.

Specification forming part of Letters Patent No. 147,150, dated February 3, 1874; application filed October 29, 1873.

*To all whom it may concern:*

Be it known that I, BENJAMIN MERRITT, of Boston, in the county of Suffolk and State of Massachusetts, have invented a Green-Corn Cutter, of which the following is a specification:

This invention relates to a machine for cutting the kernels of corn from the cob when the corn is green. It consists of a double case or cylinder having, partly above and partly within the inner case, a series of circular knives and a series of rollers and scrapers so arranged that when the ear of corn is inserted from above and driven through this series of knives, rollers, and scrapers, by means of machinery operated by hand or other power, the corn will be cleaned from the cob almost instantaneously. The object of the invention is to facilitate the process of removing the kernels of corn from the cob for purposes of canning or preparing the same for the table.

Figure 1 is an elevation of the machine. Fig. 2 is a view of the case looking from above. Fig. 3 is a vertical section of the case. Fig. 4 is a longitudinal section through the holding-jaws.

Similar letters represent like parts.

The letter A represents the base or stand on which the machine rests; B B′, the double case; C, the standard; D, the spring; $x$, a connecting-rod; $a$, the driving-piston; $b$, the pitman; $c$, the crank; $d$, the crank-lever; $e$, a revolving cam; $f$, a cam-lever; $g$ $g'$, gear-wheels; $h$ $h$, slotted cams; $i$ $i$, cam-levers having rollers $i'$ $i'$ operating within the slotted cams $h$ $h$; $j$ $j$, holding-jaws; $k$ $k$, &c., knives; $l$ $l$, &c., jointed levers having guides, as $l'$ $l'$, rollers, as $l''$ $l''$, and scrapers, as $l'''$ $l'''$; $m$ $m$, &c., hollow thumb or set screws; and $n$ $n$, &c., springs upon arms of levers.

The machine when examined explains itself, and, though composed of many parts, it is simple. With reference to the plane on which it stands, the machine is inclined at an angle. (See Fig. 1.) It is found in practice that the machine more readily discharges the kernels of corn when operated at the inclination shown than when perpendicular to the plane.

The case is composed of two parts, B B′, joined together. (See Fig. 2.) It is made of cast-iron or any suitable material. Within the inner case, or just above it, are arranged, first, two circular knives, $k$ $k$, opposite each other. (See Figs. 2 and 3.) These knives are adjusted to guides, as $l'$ $l'$. Between the knives and guides the kernels of corn pass and fall. Just below these two knives mentioned are two other similar knives, as K K, arranged on like guides, but at right angles to the first knives. These guides are a part of, or are fastened to, the ends of the lever-arms, and the other extremities of the levers are pivoted to arms attached firmly to the inner case, and these lever-arms, having the guides, are regulated by other levers which pass through both cases, and have adjustable set-screws, as $m$ $m$, &c.; and these latter arms, also, in the spaces between the double case, are surrounded by spiral springs. (See Figs. 2 and 3 for a full explanation of the arrangement of the guides, levers, set-screws, springs, &c.)

When the ear of corn is pressed (the pointed end first) between the knives and the guides, (see as in Fig. 2,) the pressure causes the levers around which are the springs to spring back, but the spirals $n$ $n$, &c., pressing up, keep the guides and knives close to the ear. Below this series of knives is arranged a series of rollers upon levers, &c., in like manner as the knives are arranged. These facilitate and ease the passage of the ear. Still below the rollers is arranged the series of scrapers on levers arranged in like manner as are the knives and rollers. These clear the kernels from the cob.

The case B B′ is attached to the standard C, as shown in Fig. 1. The standard (see Fig. 1) is bent in form, and has attached to it the machinery which forces the ear of corn through the knives, &c. The holding-jaws (see Figs. 2 and 4) arranged just above the knives open for the ear when the piston $a$ is raised, and when the piston descends its point takes the center of the ear and forces it instantly through the series of knives, &c.

To regulate the opening and closing of the jaws there is attached to each jaw, on the outside, a slotted cam, $h$, in which play rollers $i'$ $i'$ of the cam-levers $i$ $i$. Attached to the crank, between it and the gear-wheel $g$, is a revolving cam, $e$, which operates upon the cam-lever $f$, throwing it up as the crank is turned. This forces the cam-levers down, and the slotted cams $h$ $h$, being made narrower at their lowest part, force the jaws apart. The piston, being pointed, does not lose its hold upon the center of the cob. The cam-lever is attached at one end by the spring D, and this spring is attached at its other end to the standard near its top, and the operation is such that when the spring is at its least strain the piston is raised highest, the motion of which is regulated by the pitman $b$ and the crank-arm $d$ attached to the gear $g$.

What I claim as my invention, and desire to secure by Letters Patent, is—

1. The series of adjustable knives $k\ k\ k\ k$, in combination with the guides $l'\ l'\ l'\ l'$, the jointed levers $l\ l\ l\ l$, the double case B B', the springs $n\ n\ n\ n$, and the set-screws $m\ m\ m\ m$, substantially as shown and described.

2. The series of rollers $l''\ l''\ l''\ l''$, in combination with the jointed levers $l\ l\ l\ l$, the case B B', the springs $n\ n\ n\ n$, and the set-screws $m\ m\ m\ m$, substantially as shown and described.

3. The series of scrapers $l'''\ l'''\ l'''\ l'''$, in combination with the jointed levers $l\ l\ l\ l$, the case B B', the springs $n\ n\ n\ n$, and the set-screws $m\ m\ m\ m$, substantially as shown and described.

4. The combination of the jaws $j\ j$, the bent lever $i$, the link $x$, the cam-lever $f$, and the revolving cam $e$, operated by the gear $g\ g'$ and the crank $c$, substantially as shown and described.

5. The holding mechanism, consisting of the jaws $j\ j$ and bent levers $i\ i$, in combination with knives $k\ k$ and scrapers $l'''\ l'''$, as and for the purpose specified.

BENJ. MERRITT.

Witnesses:
 WM. EDSON,
 J. L. NEWTON.